(12) United States Patent
Gaultier

(10) Patent No.: US 6,469,618 B1
(45) Date of Patent: Oct. 22, 2002

(54) METHOD FOR THE IDENTIFICATION OF ELECTRONIC CARDS PRESENTED IN AN INVESTIGATION ZONE

(75) Inventor: Jean-Marie Gaultier, Rousset (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/244,468

(22) Filed: Feb. 4, 1999

(30) Foreign Application Priority Data

Feb. 4, 1998 (FR) .............................................. 98 01309

(51) Int. Cl.$^7$ ................................................. H04Q 5/22
(52) U.S. Cl. .................. 340/10.3; 340/10.2; 340/10.32; 340/10.1; 340/825.54; 340/5.61; 340/825.02; 710/46
(58) Field of Search ................................ 340/10.1, 10.3, 340/10.42, 825.02, 10.2, 10.41, 10.51, 825.56; 710/46, 47

(56) References Cited

U.S. PATENT DOCUMENTS

| | | | | |
|---|---|---|---|---|
| 4,071,908 A | * | 1/1978 | Brophy et al. ................. 710/46 |
| 5,339,073 A | * | 8/1994 | Dodd et al. ................. 340/5.61 |
| 5,471,203 A | * | 11/1995 | Sasaki et al. .......... 340/825.31 |
| 5,489,908 A | * | 2/1996 | Orthmann et al. ........ 340/10.32 |
| 5,528,221 A | * | 6/1996 | Jeuch et al. .............. 340/572.1 |
| 5,539,394 A | * | 7/1996 | Cato et al. ............. 340/825.54 |
| 5,602,538 A | * | 2/1997 | Orthmann et al. ......... 340/10.2 |
| 5,856,788 A | * | 1/1999 | Walter et al. ............... 340/10.2 |
| 5,986,570 A | * | 11/1999 | Black et al. ................ 340/10.2 |
| 6,177,858 B1 | * | 1/2001 | Raimbault et al. ......... 340/10.1 |

FOREIGN PATENT DOCUMENTS

| | | | |
|---|---|---|---|
| EP | 0427342 | 5/1991 | ............ G08B/26/00 |
| EP | 0495708 | 7/1992 | ............ G08G/1/017 |
| EP | 0696011 | 2/1996 | ............ G06K/7/08 |
| EP | 0777194 | 6/1997 | ............ G06K/7/10 |
| WO | 92/22040 | 12/1992 | ............ G06K/7/10 |
| WO | 97/34222 | 9/1997 | ............ G06F/7/04 |

* cited by examiner

*Primary Examiner*—Michael Horabik
*Assistant Examiner*—Mai V Nguyen
(74) *Attorney, Agent, or Firm*—Lisa K. Jorgenson; Allen, Dyer, Doppelt, Milbrath & Gilchrist, P.A.

(57) ABSTRACT

A method for the identification of electronic cards within an investigation zone includes encoding an identification number on M bits distributed into P blocks of Q bits assigned to each electronic card. Reconstruction of the block-by-block identification numbers is performed according to a tree-like iterative algorithm. In this iterative algorithm, each iteration includes a step for transmitting an interrogation message intended for certain electronic cards. Each iteration also includes a step for transmitting, by each of the electronic cards, a response message having a service bit in a narrow time window whose positioning in a sequence of 2Q successive identical windows indicates the value of an as yet unidentified block of bits of its identification number.

15 Claims, 3 Drawing Sheets

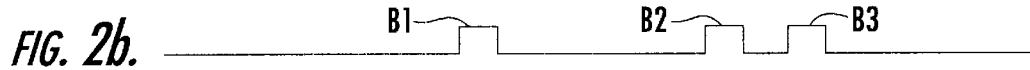
FIG. 2a.
FIG. 2b.
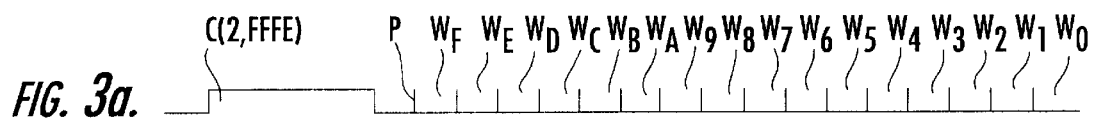
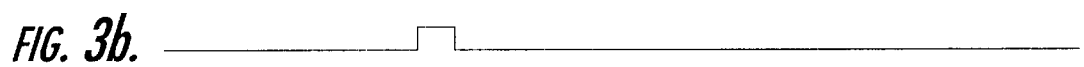
FIG. 3a.
FIG. 3b.
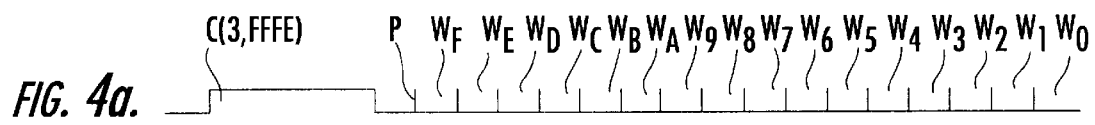
FIG. 4a.
FIG. 4b.
FIG. 5a.
FIG. 5b.
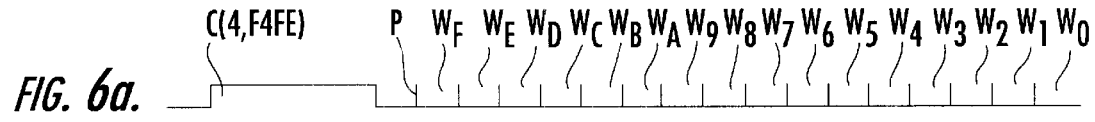
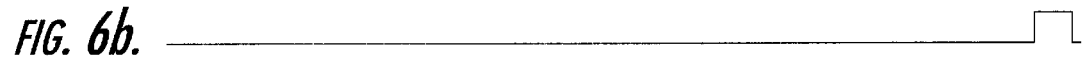
FIG. 6a.
FIG. 6b.
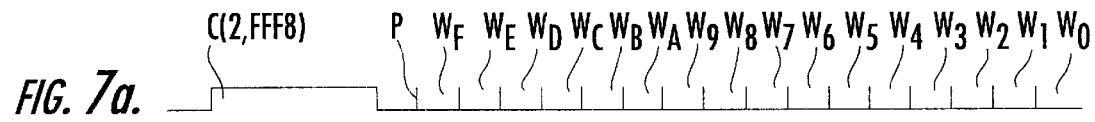
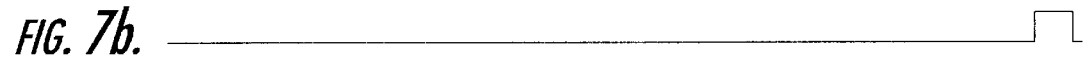
FIG. 7a.
FIG. 7b.

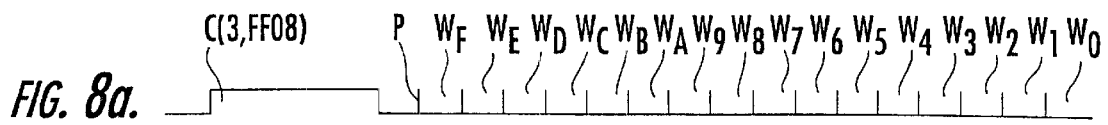
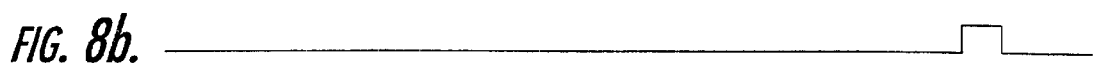
FIG. 8a.
FIG. 8b.
FIG. 9a.
FIG. 9b.
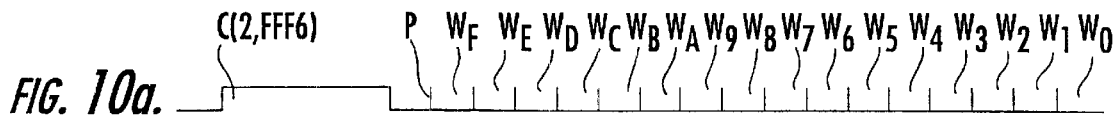
FIG. 10a.
FIG. 10b.
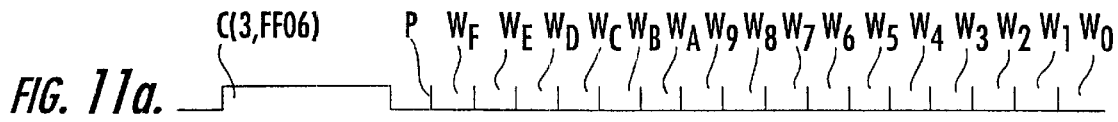
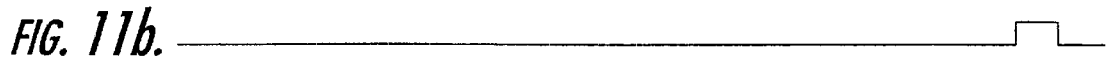
FIG. 11a.
FIG. 11b.
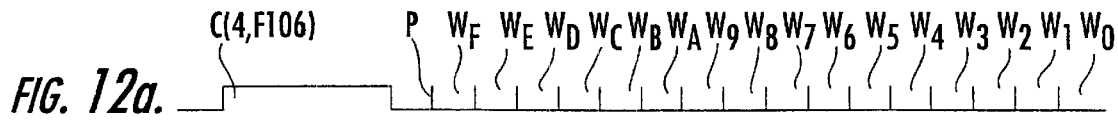
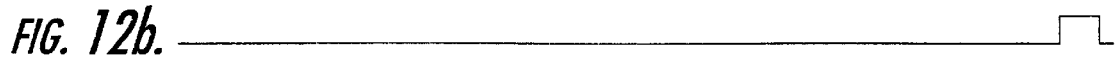
FIG. 12a.
FIG. 12b.
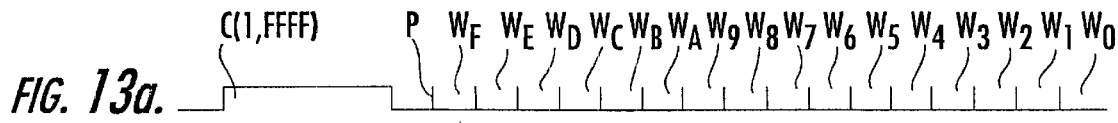
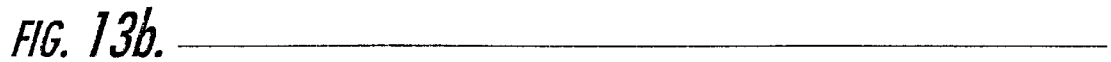
FIG. 13a.
FIG. 13b.

METHOD FOR THE IDENTIFICATION OF ELECTRONIC CARDS PRESENTED IN AN INVESTIGATION ZONE

FIELD OF THE INVENTION

The present invention relates to the field of identification systems, and, more particularly, to a method for identifying electronic cards in an identification system.

BACKGROUND OF THE INVENTION

Referring to FIG. 1, identification of electronic cards can be applied to any system having a fixed interrogation unit 10 capable of communicating or exchanging data messages with a plurality of mobile electronic cards 11–16. This communication is contactless, i.e., the messages are sent by radio frequency (RF). The transmission channel is thus formed by the ambient atmosphere.

An electronic card 11 may be an electronic module, a badge or a chip card. The electronic card 11 may be carried by an individual, a vehicle, an instrument, cattle, etc. The interrogation unit 10 may be contained in a base station, an access control terminal, an on-the-fly toll-gate, etc. As an alternative, the interrogation unit 10 is mobile and the electronic cards 11–15 are fixed. As another alternative, the interrogation unit 10 and the electronic cards 11–15 are both mobile. In all three cases, the electronic cards 11–15 may be located within a zone 20 centered around the interrogation unit 10. The zone 20 is the range in which messages may be exchanged. An electronic card 16 not within the zone 20 is outside the communications range of the fixed interrogation unit 10.

In FIG. 1, the boundary of this zone 20 is symbolized by a dashed line 25. The boundary of the zone 20 may vary in time, for example, due to the presence of foreign objects blocking propagation of the electromagnetic waves. However, it will be assumed that the boundary of the zone 20 is stable on a time scale when implementing an identification method. The volume of air contained in the zone 20 forms the channel for the transmission of messages exchanged between the interrogation unit 10 and the electronic cards 11–15. This channel is unique and has to be time-shared according to a communications protocol between the interrogation unit 10 and the electronic cards 11–15. This protocol is a master/slave type protocol. Each exchange of a message between the interrogation unit 10 (the master) and a specified card 11 (the slave) is initiated by the interrogation unit 10.

Implementation of such a system requires a method by which the interrogation unit 10 can identify the electronic cards 11–15 present in the zone 20. Hereinafter, this zone 20 is called the investigation zone because it represents the area in which the electronic cards 11–15 must be detected and identified. To identify an electronic card is the same as identifying its identification number.

For each electronic card 11, an identification number is assigned. In other words, no two electronic cards have the same identification number. A control message sent by the interrogation unit 10 for a specified electronic card contains the identification number for enabling definition of the electronic card for which the control message is intended. Due to mobility of the electronic cards 11–15 and/or of the interrogation unit 10, there is no a priori knowledge of whether the electronic cards 11–15 are in the zone 20. As the case may be, the interrogation unit 10 does not know how many and which electronic cards are present.

In the prior art, identification methods of this kind have already been proposed. These known methods implement a tree-like iterative algorithm used for a bit-by-bit reconstruction of the identification number of each card present in the investigation zone. More specifically, these methods include an exchange of interrogation messages sent by the management unit to a group of electronic cards 11–15 defined by the set of cards whose identification number includes an already identified common portion. Each concerned electronic card present in the investigation zone 20 responds by sending response messages, including its complete identification number. The interpretation of the response messages received by the interrogation unit 10 at each iteration of the algorithm makes it possible to move forward in the tree of the identification numbers by identifying the value of an additional bit of the identification number of at least one of the electronic cards. At the next iteration, the group of cards for which the interrogation message is sent by the interrogation unit 10 is smaller because the already identified common radical now includes an additional bit. These known methods suffer from two drawbacks.

The first drawback results from the length of the messages exchanged, especially the response message sent by the electronic cards. In certain applications where the number of electronic cards is large, the identification numbers may be encoded on 16 or even 32 bits. This means that a large amount of time is needed to identify all the cards present in the investigation zone.

The second drawback lies in the fact that, at each iteration, several electronic cards can simultaneously emit an answering signal if their respective identification numbers have a common portion. This results in a collision because the electromagnetic signals simultaneously transmitted on the transmission channel corrupt one another. There presently exist known methods that make it possible to overcome this collision problem. There are known methods that even exploit this phenomenon according to a particular identification algorithm. These methods may provide satisfactory results. However, they can be used only for certain types of encoding of binary information. In particular, these known methods can be applied only to systems that use a type of encoding with a return to zero of the signal in the length of the bit. This is the so-called "RZ" encoding, such as used in the Manchester type encoding scheme.

SUMMARY OF THE INVENTION

An object of the present invention is to provide a method for the identification of electronic cards that is fast and efficient, and can be applied to systems using various types of encoding of the binary information.

The invention provides a method for the identification of electronic cards where each card is assigned an identification number encoded on M bits distributed into P blocks of Q bits. According to the invention, this method includes a block-by-block reconstruction of the identification numbers of the cards present in an investigation zone according to an arborescent iterative algorithm. At each iteration, the reconstruction comprises the following steps.

An interrogation unit transmits an interrogation message for certain electronic cards authorized to respond. All the cards are authorized to respond at the first iteration, and the only cards authorized to respond at each subsequent iteration are the unidentified cards that have an identification number of which at least one block of bits has been identified in a prior iteration. Each card present and authorized to respond then transmits a response message intended for the interrogation unit. The response message includes at least one service bit sent in a narrow time window whose positioning in a sequence of 2Q successive identical windows indicates the value of an as yet unidentified block of bits of its identification number.

According to one advantage of the invention, at each iteration the response signal sent by the electronic cards that respond includes only one or more service bits in a reduced number. Namely, a number significantly smaller than the number M of bits of the identification number sent according to the prior art methods. The duration of transmission of the response message is therefore relatively short. Consequently, the identification of the cards present in the investigation zone is quicker. The expression "service bit" refers to a bit whose logic value bears no useful information per se. The service bit or bits have an identical logic value corresponding to the electronic card that responds.

Furthermore, the transmission of the same response message simultaneously by several electronic cards gives rise to a collision which has no effect on executing the identification algorithm. This characteristic, as well as other characteristics and advantages of the invention, shall appear more clearly from the following detailed description. This description is given purely by way of an illustration and must be read with reference to the appended drawings.

BRIEF DESCRIPTION OF THE DRAWINGS

In these figures:

FIGS. 2a and 2b are timing diagrams of the signals exchanged between the interrogation unit and the electronic cards at the first iteration according to the present invention; and FIGS. 3a, 3b to 13a, 13b are timing diagrams of signals exchanged between the interrogation unit and the electronic cards at subsequent iterations according to the present invention.

DETAILED OF THE PREFERRED EMBODIMENTS

Figure 1:
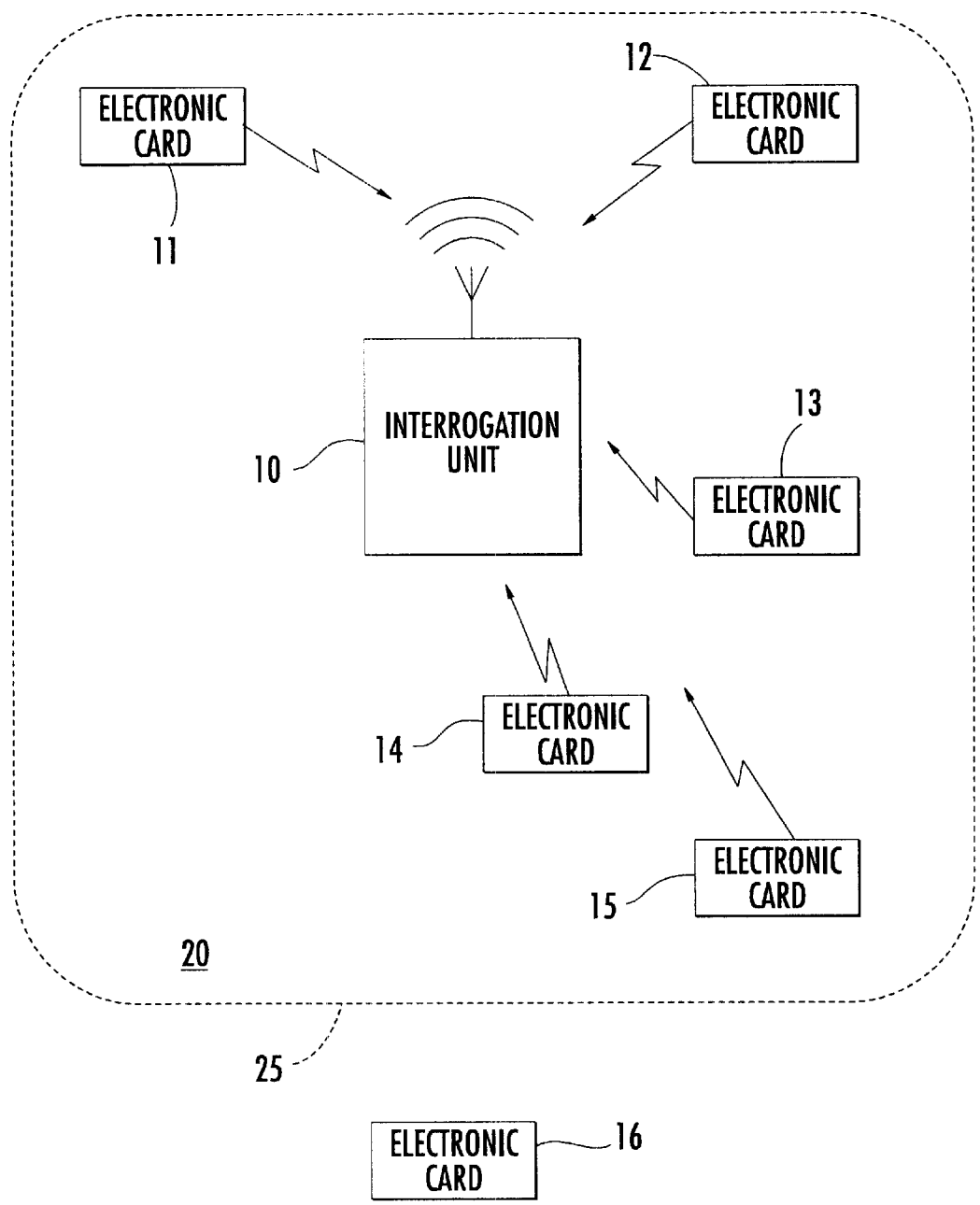
FIG. 1 shows an exemplary system including an interrogation unit and a plurality of electronic cards according to the prior art.

The following description of an exemplary implementation of the method according to the invention has an identification number assigned to each electronic card. The identification number is encoded on 16 bits (M=16) distributed into four blocks (P=4) of four bits each (Q=4).

The electronic cards comprise a memory in which the identification number is saved. In certain applications, the identification numbers are assigned in the factory during the manufacture of the electronic card. The memory is then a non-volatile memory of an EPROM, EEPROM, Flash-EPROM or other similar type. In other applications, the identification number is defined randomly and is assigned to each card when it is first entered into the message range zone 20 surrounding the interrogation unit 10 (FIG. 1). The memory may then be a volatile memory. Hereinafter, and for clarity of the description, the value of a four-bit block is indicated in hexadecimal notation. Thus, the value of a complete identification number is indicated by four symbols among the symbols of this notation (FIGS. 0 to 9 and letters A to F). The value FFFF is not assigned as an identification number to any card. The reason for this will be understood below.

The method of identification according to the invention includes identifying the electronic cards 11–15 present in the investigation zone 20 by reconstructing their identification numbers using successive blocks of bits according to an arborescent iterative algorithm. Schematically, it is possible to represent all the values of the identification numbers according to a tree-like structure. According to the terminology for this type of structure used in the computer field, it will be noted that this tree has four generations (since P=4) and that each parent has sixteen children (namely 2Q, with Q=4).

Preferably, the blocks of bits are identified successively in the order of their rank within the identification numbers. This has the advantage of simplicity. However, it is also possible to proceed differently by successively identifying the four blocks of bits in another order. In the example, the method starts by identifying the block of least significant bits, which is called the first block. The block of most significant bits is called the fourth or last block. Similarly, the terms such as following, preceding, first and last are used below with reference to this convention. It is equally possible to proceed in the reverse order by beginning with the identification of the block of most significant bits.

The interrogation unit 10 may send an interrogation message C. This interrogation message C comprises a first parameter k for indicating the rank of an unidentified block of bits for the identification number of certain cards. As an integer, k may take any one of the values from 1 to P. The interrogation message C also comprises a second parameter which is a reference number RN having the same format as the identification numbers, i.e., being encoded on M bits distributed into P blocks of Q bits (M=16, P=Q=4). The function of this second parameter is to provide the value of the already identified block or blocks of bits of the identification numbers of the cards for which the interrogation message is intended. Hereinafter and in the figures, the interrogation message C sent by the unit 10 shall be written in the form C(k,XXXX), where XXXX designates the hexadecimal notation of the reference number RN.

At each iteration, the interrogation message is sent by the interrogation unit 10 to certain electronic cards which alone are authorized to respond. The cards authorized to respond are defined by groups according to the values of the first and second parameters taken in combination. At the first iteration, k is equal to unity (k=1) and the reference number RN is equal to the value FFFF which, as previously stated, is not assigned to any card as an identification number. The interrogation message C(1,FFFF) is interpreted by the electronic cards 11–15 presented in the investigation zone 20 as an indication to respond, i.e., to send a response message. The nature of this response message shall be described below. In other words, all the electronic cards 11–15 are authorized to respond to the interrogation message C(1, FFFF) sent by the interrogation unit 10 at the first iteration. At each subsequent iteration, k is different from unity. The only cards authorized to respond are those which are as yet unidentified and have an identification number. Identification refers to at least one block of bits that has been identified during a prior iteration.

With respect to the first of these two conditions, according to one characteristic of the invention, as soon as all the blocks of bits of an identification number have been identified, the interrogation unit 10 sends a message S, called a "standby-setting message". This message is addressed to the corresponding card so that it is no longer authorized to respond to any interrogation messages that may be sent by the interrogation unit during a subsequent iteration for which the second condition above may possibly be fulfilled. This card remains in a state of standby, at least for the time needed to identify all the cards present in the investigation zone 20.

Naturally, the card placed on standby may subsequently be awakened upon reception of a particular message W, called an "awakening message". This message may be sent by the interrogation unit 10 so that the card is again permitted to respond to the control messages that may be sent to it by the interrogation unit 10. The standby-setting message S and the awakening message W each have a single parameter which is the identification number of the electronic card for which they are intended. This is why they are respectively written S(YYYY) and W(YYYY), where YYYY is the hexadecimal notation of the value of this number.

In one exemplary embodiment with respect to the second of the two conditions expressed above, at each iteration other than the first one, the (k−1)th first blocks of bits of the reference number RN forming the second parameter of the message C sent by the interrogation unit 10 have the value of blocks of bits which have been identified during one or more prior iterations. In other words, at each iteration other than the first one, the blocks of bits for the reference number RN have the same value as the already identified blocks. These blocks of bits have the same rank as the already identified blocks of bits of the cards authorized to respond. Furthermore, at each iteration other than the first one, the only cards permitted to respond are those having an identification number whose (k−1)th first blocks of bits have the same value as the (k−4)th first blocks of bits of the reference number RN.

If the value of the parameter k is equal to two (k=2), the only cards authorized to respond are those for which the first block of the identification number has the same value as the first block of the reference number RN. Similarly, if the value of the parameter k is equal to three (k=3), the only cards authorized to respond are the cards for which first and second blocks of the identification number have the same value as, respectively, the first and the second blocks of the reference number RN. Similarly, if the value of the parameter k is equal to four (k=4), the only cards authorized to respond are the cards for which the first, second and third blocks of the identification number have the same value as, respectively, the first, second, and third blocks of bits of the reference number RN.

The following description explains the way in which the different electronic cards present in the investigation zone 20 are authorized to respond. The cards respond to the interrogation messages sent by the interrogation unit 10 at each iteration of the algorithm according to the method of the invention. At each iteration, the interrogation unit 10 sends the interrogation signal C(k,XXXX). In response, each card present and authorized to respond sends a response message addressed to the interrogation unit 10. This response message is a service bit sent in a time window whose positioning, in a sequence of 2Q successive identical time windows, indicates the value of an as yet unidentified block of bits of its identification number. More specifically, in a preferred example, this is the value of the kth block of bits. The (k−1)th previous blocks have already been identified during prior iterations if k is different from one, i.e., if it is an iteration other than the first one. Preferably, the response message has only one service bit thus positioned. For reasons of security with respect to disturbances in the channel, the response message could include a couple of service bits, preferably with distinct logic values.

The time windows are narrow, i.e, their width is equal or slightly greater than the period of transmission of the service bit or bits of the response message. In this way, the sequence of 2Q successive identical time windows is as short as possible. This is an advantage from the viewpoint of speed of identification of the cards present in the investigation zone 20. Should the response message comprise only one service bit, it is indicated that the width of the time window is preferably equal to an elementary time unit where the terms "elementary time unit" designate the duration of transmission of a bit. It is known that this duration depends essentially on the frequency of transmission of the messages. Should the response message comprise a pair of service bits, the time windows have a width equal to two elementary time units.

Advantageously, the beginning or starting point of the time windows in the sequence of 2Q successive identical windows is marked by edges of 2Q pulses sent successively by the interrogation unit 10 after the interrogation signal. These edges are received by the electronic cards 11–15 and may be counted by a pulse counter. The result of this counter is taken into account by the electronic cards 11–15 to determine the instant for sending the response message as a function of the value of kth block of bits of their identification number.

An exemplary implementation of the method of identification according to the invention shall now be described with reference to FIGS. 2a and 2b to 13a and 13b. For this explanation, reference is made to the five electronic cards 11, 12, 13, 14 and 15 located within the investigation zone 20 (FIG. 1). These cards have an identification number whose value in hexagonal notation is respectively 07FE, 04FE, 3208, 1208 and 0106.

FIG. 2a is a timing diagram showing the signal sent on the transmission channel by the interrogation unit 10 at the first iteration. FIG. 2b is a timing diagram synchronized with the timing diagram of FIG. 2a. FIG. 2b shows the response signals sent at the first iteration by the electronic cards 11–15 present in the zone 20. The interrogation unit 10 sends the interrogation signal C (1,FFFF) to all the electronic cards 11–15. Then it sends a series of sixteen pulses, such as the pulse P spaced out in time by a duration of at least equal to one elementary time unit, and preferably equal to this duration. This series of sixteen pulses marks the starting point of an equivalent number of time windows referenced WF, WE, WD, . . . , W1, W0.

In response to the interrogation message C(1,FFFF), each card among the cards present 11–15 sends a response message addressed to the interrogation unit 10. This response message is a service bit sent in a time window whose positioning in the sequence of sixteen successive identical time windows indicates the value of the first block of bits of their identification number.

Thus, the cards 11 and 12 send a bit B1 in the time window WE, the cards 13 and 14 send a bit B2 in the window W8 and the card 15 sends a bit B3 in the window W6. These response messages are received and interpreted by the interrogation unit 10 as a function of their position between sixteen pulses, such as the pulse P. For example, the interrogation unit 10 comprises an antenna and means for sampling the signal received between the pulses, such as the pulse P. It will be noted that two bits are sent simultaneously in each of the time windows WE and W8. The electromagnetic signals are then superimposed on the transmission channel formed by the surrounding air. This is not inconvenient inasmuch as the interrogation unit 10 interprets the reception of a bit in a specified time window. This signifies that at least one electronic card has an identification number whose first block of bits has the corresponding value. The interrogation unit 10 continues executing the identification algorithm accordingly. If a response bit has not been received by the interrogation unit 10 in the sixteen successive time windows, it would mean that no card could be found in the investigation zone 20.

At the end of the first iteration, it is therefore known that the following are in the investigation zone: at least one card with an identification number whose first block has the value E; at least one card with an identification number whose first block has the value 8; and at least one card with an identification number whose first block has the value 6. The iterations of the method other than the first iteration shall now be described with reference to FIGS. 3a, 3b to 13a, 13b which are comparable to FIGS. 2a, 2b.

At the second iteration (FIG. 3a), the interrogation unit 10 sends the message C(2,FFFE). The only cards authorized to respond are those having an identification number whose first block has the value F identified at the first iteration. A response bit is sent in the time window WF alone (FIG. 3b). This means that at least one card has an identification number whose second block of bits has the value F, the first block of bits of the card or cards furthermore have the value E identified at the first iteration.

At the third iteration (FIG. 4a), the interrogation unit 10 sends the message C(3,FFFE). The only cards authorized to respond are those having an identification number whose first and second blocks respectively have the value E and the value F. A response bit is sent in the time window W7 and another one is sent in the time window W4 (FIG. 4b). This means that there were at least two cards that responded to the interrogation message C(2,FFFE) sent at the second iteration. At least one of these cards has an identification number whose third block of bits has the value 7 and at least one other card has an identification number whose third block of bits has the value 4.

At the fourth iteration (FIG. 5a), the interrogation unit 10 sends the message C(4,F7FE). The only cards authorized to respond are those having an identification number whose first, second and third blocks of bits respectively have the value E, F and 7. A response bit is sent in the time window WO alone (FIG. 5b). At this stage it is certain that only one card has responded to the interrogation message since, by assumption, each identification number is unique. In other words, a terminal branch of the tree of identification numbers has been reached. A card has therefore been identified with the complete identification number 07FE. This is the card 11. The interrogation unit then sends the standby-setting signal S(07FE) so that the card 11 is placed on standby. Consequently, it is no longer authorized to respond to the interrogation messages C(k,XXXX) sent by the interrogation unit 10.

According to the principle of a tree-like algorithm, the other branches of the tree corresponding to identification numbers are then explored from the last point in time when the choice on the value of the already identified blocks of bits had been made. In other words, the operation goes back towards the root of the tree to the branching point and then returns to explore another branch that could lead to the identification number of another card present in the investigation zone 20. This is why, at the fifth iteration (FIG. 6a), the interrogation unit 10 sends the message C(4,F4FE). The only cards authorized to respond are the as yet unidentified cards having an identification number whose first, second and third blocks of bits respectively have the value E, F and 4. It will be noted that the card 11 does not respond to this interrogation message, although the first three blocks of bits of its identification number have the values indicated above, inasmuch as they are not authorized to respond. A response bit is sent in the time window W0 alone (FIG. 6b). As stated above with respect to the fifth iteration, it is certain that only one card has responded to the interrogation message. A card has therefore been identified with the complete identification number 04FE. This is the card 12.

The interrogation unit then sends the standby-setting signal S(04FE) so that the card 12 is placed on standby. Just like the previously identified card 11, the card 12 is no longer authorized to respond to the interrogation messages C(k, XXXX) sent by the interrogation unit 10.

At the sixth iteration (FIG. 7a), the interrogation unit 10 sends the interrogation signal C(2,FFF8). The only cards authorized to respond are the as yet unidentified cards having an identification number whose first block of bits has the value 8. A response bit is sent in the time window W0 (FIG. 7b). There is at least one card present in the investigation zone 20 having an identification number whose first and second blocks of bits respectively have the value 8 and the value 0.

At the seventh iteration (FIG. 8a), the interrogation unit 10 sends the interrogation signal C(3,FFF8). The only cards authorized to respond are the as yet unidentified cards having an identification number whose first and second blocks of bits respectively have the value 8 and the value 0. A response bit is sent in the time window W2 (FIG. 8b). There is therefore at least one card present in the investigation zone 20 having an identification number whose first, second and third blocks of bits respectively have the value 8, the value 0 and the value 2.

At the eighth iteration (FIG. 9a), the interrogation unit 10 sends the interrogation signal C(4,F208). The only cards authorized to respond are the as yet unidentified cards having an identification number whose first, second and third blocks of bits respectively have the value 8, the value 0 and the value 2. A response bit is sent in the time window W3 and another one in the time window W1 (FIG. 9b). A card whose complete identification number is 3208 has been identified and a card whose complete identification number is 1208. These are respectively the card 13 and the card 14. The interrogation unit 10 then sends the standby-setting signal S(3208) and the standby-setting signal S(1208) so that the cards 13 and 14 are placed on standby. Just like the already identified card 11 and the card 12, the cards 13 and 14 are no longer authorized to respond to the interrogation messages C(k,XXXX) sent by the interrogation unit 10.

At the ninth iteration (FIG. 10a), the interrogation unit 10 sends the interrogation signal C(2,FFF6). The only cards authorized to respond are the as yet unidentified cards having an identification number whose first block of bits has the value 6. A response bit is sent in the time window W0 (FIG. 10b). There is therefore at least one card present in the investigation zone 20 having an identification number whose first and second blocks of bits respectively have the value 6 and the value 0.

At the tenth iteration (FIG. 11a), the interrogation signal 10 sends the interrogation signal C(3,FF06). The only cards authorized to respond are the as yet unidentified cards having an identification number whose first and second blocks of bits respectively have the value 6 and the value 0. A response bit is sent in the time window W1 (FIG. 11b). There is therefore at least one card present in the investigation zone 20 having an identification number whose first, second and third blocks of bits respectively have the value 6, the value 0 and the value 1.

At the eleventh iteration (FIG. 12a), the interrogation unit 10 sends the interrogation signal C(4,F106). The only cards authorized to respond are the as yet unidentified cards having an identification number whose first, second and third blocks of bits respectively have the value 6, the value 0 and the value 1. A response bit is sent in the time window W0 (FIG. 12b). We have therefore identified a card hose complete identification number is 0106. This is the card 15. The interrogation unit then sends the standby-setting signal S(0106) so that the card 15 is placed on standby. Just like the already identified cards 11, 12, 13 and 14, the card 15 is no longer authorized to respond to the interrogation messages C(k,XXXX) sent by the interrogation unit 10.

At this stage, the interrogation unit 10 has exhausted the paths of exploration of the tree indicated by the response messages received in response to the interrogation message C(1,FFFF) sent at the first iteration. There should therefore no longer be any electronic cards 11–15 present in the investigation zone 20 other than the five cards already identified. The method of identification can thus come to an end. However, according to an advantageous characteristic of the invention, the method of identification comprises another step for the sending (FIG. 13a) of an interrogation signal C(1,FFFF) addressed to all the cards, except for the cards already identified and placed on standby during prior iterations. This step is performed after the identification and standby-setting of the last of the cards that are in the investigation zone 20 during the first iteration. This additional characteristic of the method, which is not necessary but is advantageous, makes it possible to ascertain that no new electronic card has entered the investigation zone 20 since the first iteration. That is, for the duration of the implementation of the identification method.

In FIG. 13b, it can be seen that no response message has been sent in the sequence of successive identical time windows WF to W0. This means that no electronic card is present in the investigation zone 20 except for the already identified cards 11–15 which are not authorized to respond. It is thus certain that the detection and identification of the cards present in the investigation zone 20 has validly ended.

As those skilled in the art will have understood, the method of identification can be easily implemented by a microcontroller in the interrogation unit 10. This microcontroller has memory registers to store the current value of the parameter k and the parameter RN, the values of the blocks of bits already identified, and the values of the identification numbers of the cards already identified. The microcontroller also includes a memory in which a program for the implementation of the method is saved.

Each electronic card also has an antenna for the reception of the interrogation message, the standby-setting message, the awakening message, as well as pulses such as P, and for the sending of the response message. Each card also has a microcontroller for the extraction of the parameter or parameters of such messages, the interpretation of the value of these parameters, and the formation of the response message as a function of these values and of the value of its identification number.

It will be noted that, according to the method of identification of the invention, the identification of a card requires at least P iterations since an identification number is identified block by block. At best case, a block of bits is identified at each iteration. This result must be compared with the performance characteristics of the prior art methods which, in the best case enables the identification of the card in only one iteration. The identification number is sent as an integer in response to the interrogation message. The best case is when only one card is present in the investigation zone 20. Nevertheless, in this best case, the method of the invention is the same except it is not P times slower than the prior art methods. The duration of the messages exchanged is smaller because it not the identification number on M bits that is sent, but one or even two service bits during a sequence of 2Q successive time windows. In particular, the response message sent by the cards is in response to the interrogation message.

Furthermore, if several cards are simultaneously in the investigation zone 20, the identification method according to the invention is more rapid because there are no problems of collision between the response messages to be taken into account. The complete identification of five cards present simultaneously in the investigation zone 20 has required only eleven iterations despite frequent collisions between the response messages. No loss of time has been entailed by the processing of the collision between the response messages. The choice of the values of P and Q for a given value of M is optimized as a function of the number of electronic cards likely to be simultaneously present in the investigation zone 20. This number depends of course on the intended application.

That which is claimed is:

1. A method for identifying a plurality of electronic cards, with each electronic card assigned an identification number encoded on M bits distributed into P blocks of Q bits, the method comprising:

reconstructing block-by-block the identification number of each electronic card present in an investigation zone in proximity to an interrogation unit, the block-by-block reconstruction being performed according to an iterative algorithm, and at each iteration the method further comprises transmitting from the interrogation unit an interrogation signal intended for certain electronic cards authorized to respond, all the electronic cards being authorized to respond at a first iteration, and only electronic cards authorized to respond at each subsequent iteration are as yet unidentified electronic cards having an identification number, at least one block of bits is identified during a prior iteration, transmitting a response message for the interrogation unit from each electronic card present in the investigation zone and authorized to respond, the response message comprising at least one service bit transmitted in a time window positioned in a sequence of 2Q successive identical windows for indicating a value of an as yet unidentified block of bits of a corresponding identification number, after all the blocks of bits of an identification number have been identified, transmitting from the interrogation unit a signal for placing the corresponding electronic card on standby so that it is no longer authorized to respond to the interrogation messages transmitted by the interrogation unit; and after identifying and placing on standby the last of the electronic cards that were in the investigation zone during the first iteration, transmitting from the interrogation unit an interrogation signal addressed to all the electronic cards except those already identified and placed on standby.

2. A method according to claim 1, wherein a beginning of the time window in the sequence of 2Q successive identical windows is marked by edges of 2Q pulses sent successively after transmitting the interrogation signal.

3. A method according to claim 1, wherein a width of the time window is substantially equal to a duration of transmission of the response message.

4. A method according to claim 1, wherein the interrogation signal comprises a first parameter for indicating a rank of the as yet unidentified block of bits, and a second parameter indicating a value of the already identified at least one block of bits for the identification number for a corresponding electronic card present in the investigation zone.

5. A method according to claim 4, wherein the second parameter is a reference number encoded on M bits distributed into P blocks of Q bits.

6. A method according to claim 5, wherein at the first iteration, the second parameter has a value that is not assigned to an electronic card as an identification number.

7. A method according to claim 6, wherein at each iteration other than the first iteration, a blocks of bits of the reference number that have a same rank as the already identified blocks of bits of the electronic cards authorized to respond have a same value as the already identified blocks.

8. A method according to claim 1, wherein the blocks of bits of the identification numbers corresponding to the electronic card present in the investigation zone are identified successively in an order of rank within the identification numbers.

9. A method for identifying a plurality of electronic cards, with each electronic card assigned an identification number encoded on M bits distributed into P blocks of Q bits, the method comprising:

reconstructing block-by-block the identification number of each electronic card present in an investigation zone in proximity to an interrogation unit, the block-by-block reconstruction being performed according to an iterative algorithm, and at each iteration the method further comprises transmitting from the interrogation unit an interrogation signal intended for certain electronic cards authorized to respond, all the electronic cards being authorized to respond at a first iteration, and only electronic cards authorized to respond at each subsequent iteration are as yet unidentified electronic cards having an identification number, at least one block of bits is identified during a prior iteration, and transmitting a response message for the interrogation unit from each electronic card present in the investigation zone and authorized to respond, the response message comprising at least one service bit transmitted in a time window positioned in a sequence of 2Q successive identical windows for indicating a value of an as yet unidentified block of bits of a corresponding identification number, a width of the time window is substantially equal to a duration of transmission of the response message, after all the blocks of bits of an identification number have been identified, transmitting from the interrogation unit a signal for placing the corresponding electronic card on standby so that it is no longer authorized to respond to the interrogation messages transmitted by the interrogation unit; and after identifying and placing on standby the last of the electronic cards that were in the investigation zone during the first iteration, transmitting from the interrogation unit an interrogation signal addressed to all the electronic cards except those already identified and placed on standby.

10. A method according to claim 9, wherein a beginning of the time window in the sequence of 2Q successive identical windows is marked by edges of 2Q pulses sent successively after transmitting the interrogation signal.

11. A method according to claim 9, wherein the interrogation signal comprises a first parameter for indicating a rank of the as yet unidentified block of bits, and a second parameter indicating a value of the already identified at least one block of bits for the identification number for a corresponding electronic card present in the investigation zone.

12. A method according to claim 11, wherein the second parameter is a reference number encoded on M bits distributed into P blocks of Q bits.

13. A method according to claim 12, wherein at the first iteration, the second parameter has a value that is not assigned to an electronic card as an identification number.

14. A method according to claim 13, wherein at each iteration other than the first iteration, a blocks of bits of the reference number that have a same rank as the already identified blocks of bits of the electronic cards authorized to respond have a same value as the already identified blocks.

15. A method according to claim 9, wherein the blocks of bits of the identification numbers corresponding to the electronic card present in the investigation zone are identified successively in an order of rank within the identification numbers.

* * * * *

UNITED STATES PATENT AND TRADEMARK OFFICE
CERTIFICATE OF CORRECTION

PATENT NO.    : 6,469,618 B1
DATED         : October 22, 2002
INVENTOR(S)   : Jean-Marie Gaultier It is certified that error appears in the above-identified patent and that said Letters Patent is hereby corrected as shown below:

Column 3,
Line 42, delete "DETAILED OF THE PREFERRED EMBODIMENTS" insert
-- DETAILED DESCRIPTION OF THE PREFERRED EMBODIMENTS --

Column 5,
Line 29, delete "(k-4)th" insert -- (k-1)th --

Column 10,
Line 50, delete "block of bits of a corresponding identification number, after all the blocks of bits of an identification number" insert -- block of bits of a corresponding identification number, after all the blocks of bits of an identification number --

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,469,618 B1  Page 1 of 1
DATED : October 22, 2002
INVENTOR(S) : Jean-Marie Gaultier It is certified that error appears in the above-identified patent and that said Letters Patent is hereby corrected as shown below:

Title page,
Item [57], ABSTRACT,
Line 11, delete "2Q" insert -- $2^Q$ --

Column 2,
Lines 57-58, delete "an arborescent" insert -- a tree-like --

Column 4,
Lines 2-3, delete "an arborescent" insert -- a tree-like --
Line 8, delete "2Q" insert -- $2^Q$ --

Column 5,
Line 55, delete "2Q" insert -- $2^Q$ --

Column 6,
Lines 2, 15 and 16, delete "2Q" insert -- $2^Q$ --

Column 10,
Lines 8, 49, 65 and 66, delete "2Q" insert -- $2^Q$ --

Column 12,
Lines 3, 20 and 21, delete "2Q" insert -- $2^Q$ --

Signed and Sealed this

Seventeenth Day of February, 2004

JON W. DUDAS
*Acting Director of the United States Patent and Trademark Office*